(12) United States Patent
Lutzhöft et al.

(10) Patent No.: US 8,978,961 B2
(45) Date of Patent: Mar. 17, 2015

(54) METHOD FOR PRODUCING CONNECTING ELEMENTS BY WAY OF A PRESSURE WELDING PROCESS AND CONNECTING ELEMENT

(75) Inventors: Jens Lutzhöft, Hamburg (DE); Jörn Grotherr, Halstenbek (DE); Christian Hoffmann, Hamburg (DE); Heiko Junge, Hamburg (DE)

(73) Assignee: Blohm + Voss Oil Tools GmbH, Hamburg (DE)

( * ) Notice: Subject to any disclaimer, the term of this patent is extended or adjusted under 35 U.S.C. 154(b) by 359 days.

(21) Appl. No.: 13/121,067

(22) PCT Filed: Jul. 18, 2009

(86) PCT No.: PCT/DE2009/001003
§ 371 (c)(1),
(2), (4) Date: Aug. 11, 2011

(87) PCT Pub. No.: WO2010/034272
PCT Pub. Date: Apr. 1, 2010

(65) Prior Publication Data
US 2011/0293363 A1      Dec. 1, 2011

(30) Foreign Application Priority Data

Sep. 26, 2008 (DE) .......................... 10 2008 050 581

(51) Int. Cl.
*B23K 20/12* (2006.01)
*B23K 9/20* (2006.01)

(52) U.S. Cl.
CPC . *B23K 9/20* (2013.01); *B23K 20/12* (2013.01); *B23K 20/129* (2013.01); *B23K 2203/04* (2013.01); *B23K 2203/06* (2013.01)
USPC ............................ 228/112.1; 228/2.1; 228/3.1

(58) Field of Classification Search
USPC .................................. 228/2.1, 2.3, 3.1, 112.1
See application file for complete search history.

(56) References Cited

U.S. PATENT DOCUMENTS

| | | | |
|---|---|---|---|
| 4,432,662 A | | 2/1984 | Ronnkvist |
| 4,484,833 A | * | 11/1984 | Gallagher, Jr. ................. 403/267 |
| 4,582,242 A | | 4/1986 | Spindler |
| 5,088,638 A | * | 2/1992 | Karaev et al. ................ 228/112.1 |
| 6,334,571 B1 | * | 1/2002 | Shantz et al. .................. 228/256 |
| 6,481,082 B1 | * | 11/2002 | Widney et al. .............. 29/407.01 |
| 7,234,627 B2 | * | 6/2007 | Bostik .......................... 228/234.1 |
| 2002/0014514 A1 | * | 2/2002 | Shimizu et al. ................ 228/104 |

FOREIGN PATENT DOCUMENTS

| | | | |
|---|---|---|---|
| EP | 138603 A2 | * | 4/1985 |
| EP | 145154 A | * | 6/1985 |
| GB | 2095591 A | * | 10/1982 |
| WO | WO 2004011183 A1 | * | 2/2004 |
| WO | 2008010266 | | 1/2008 |
| WO | 2008027474 A | | 3/2008 |

* cited by examiner

*Primary Examiner* — Devang R Patel
(74) *Attorney, Agent, or Firm* — Lucas & Mercanti, LLP; Klaus P. Stoffel

(57) ABSTRACT

The method is used to produce connecting elements (1). The connecting elements (1) are intended for coupling functional elements for applications in the field of oil drilling technology. The connecting element comprises two end pieces (2, 3) and at least one spacer (4) connecting the end pieces to each other. At least one spacer (4) is connected to at least one of the end pieces (2, 3) by pressure welding.

15 Claims, 3 Drawing Sheets

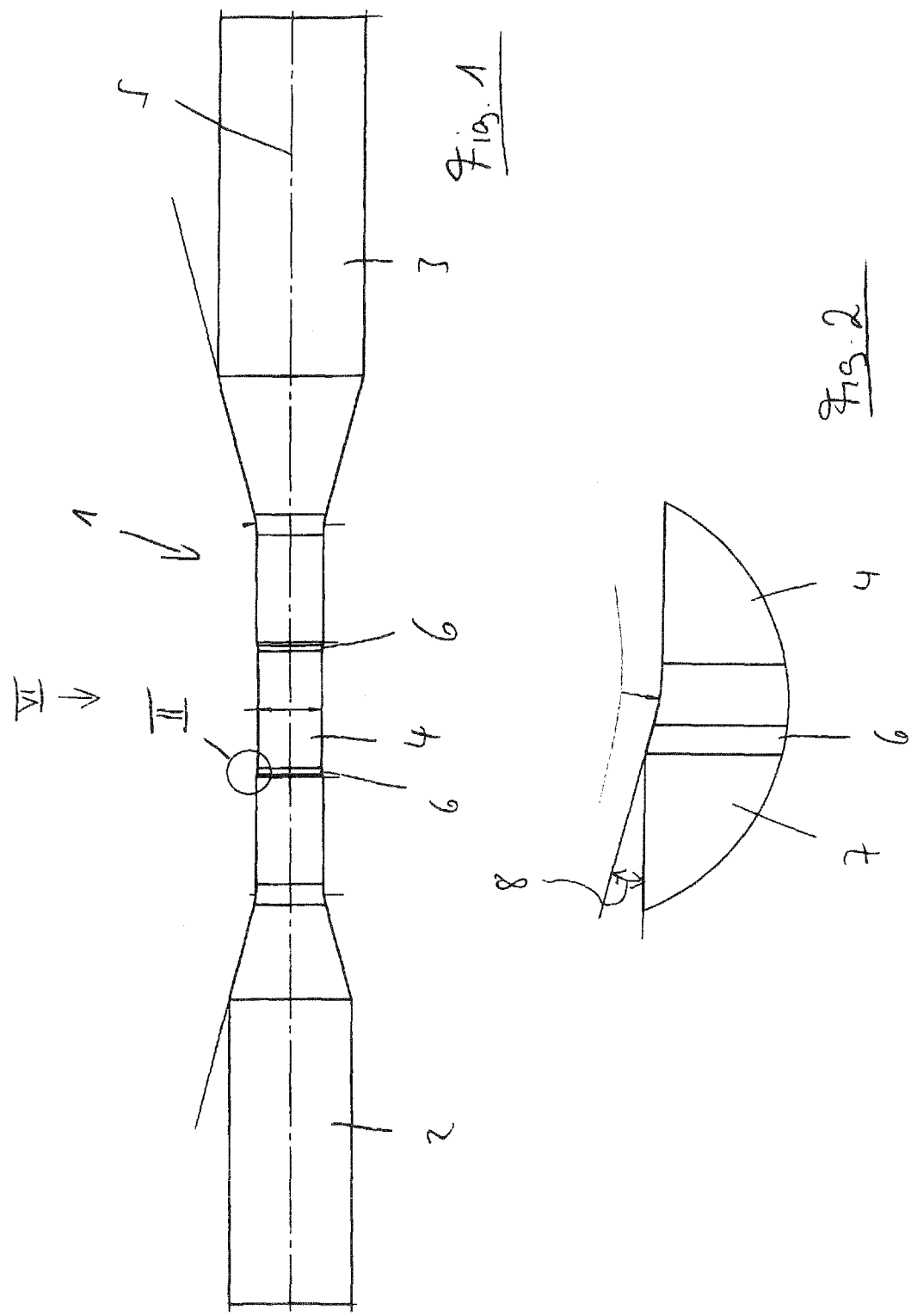

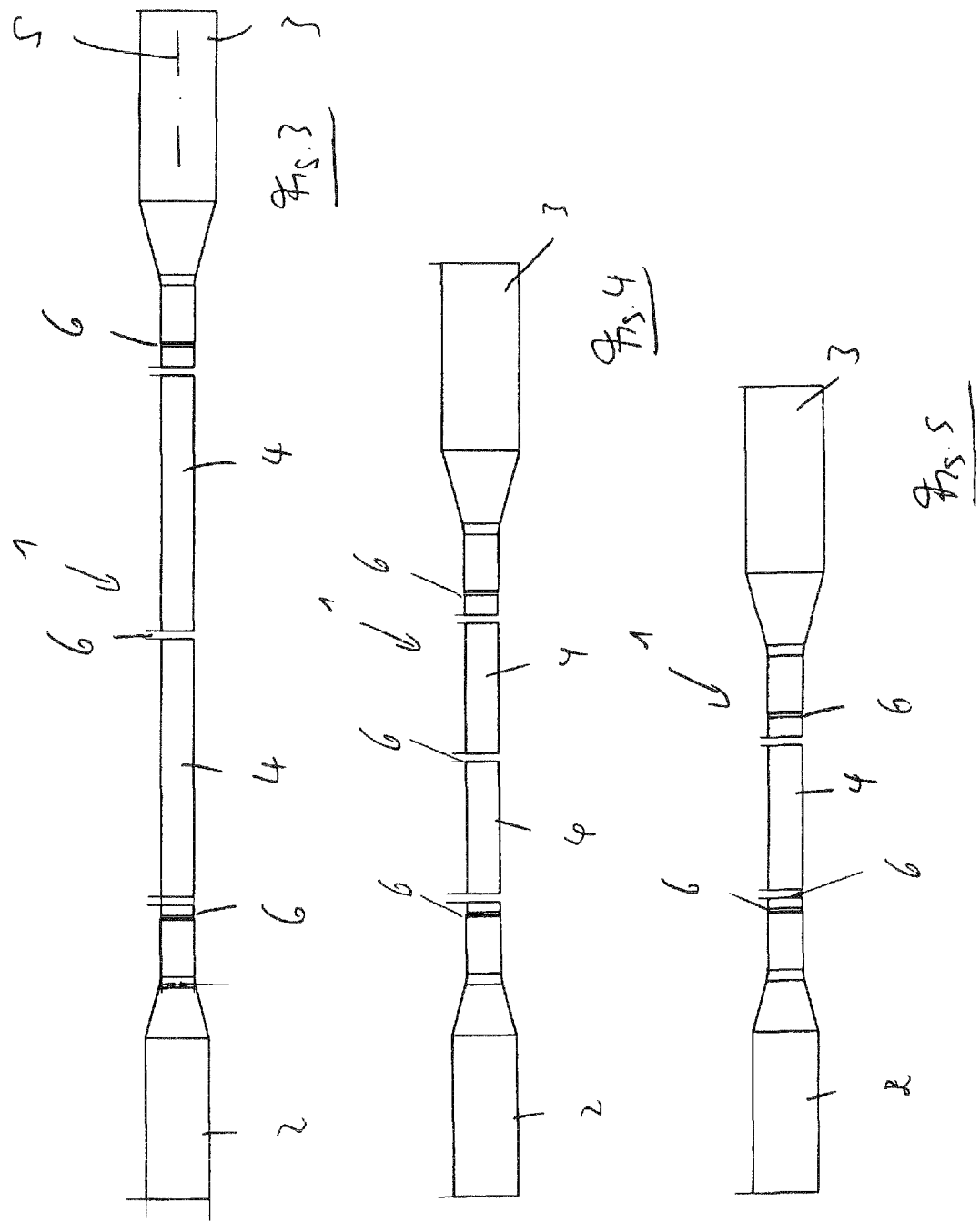

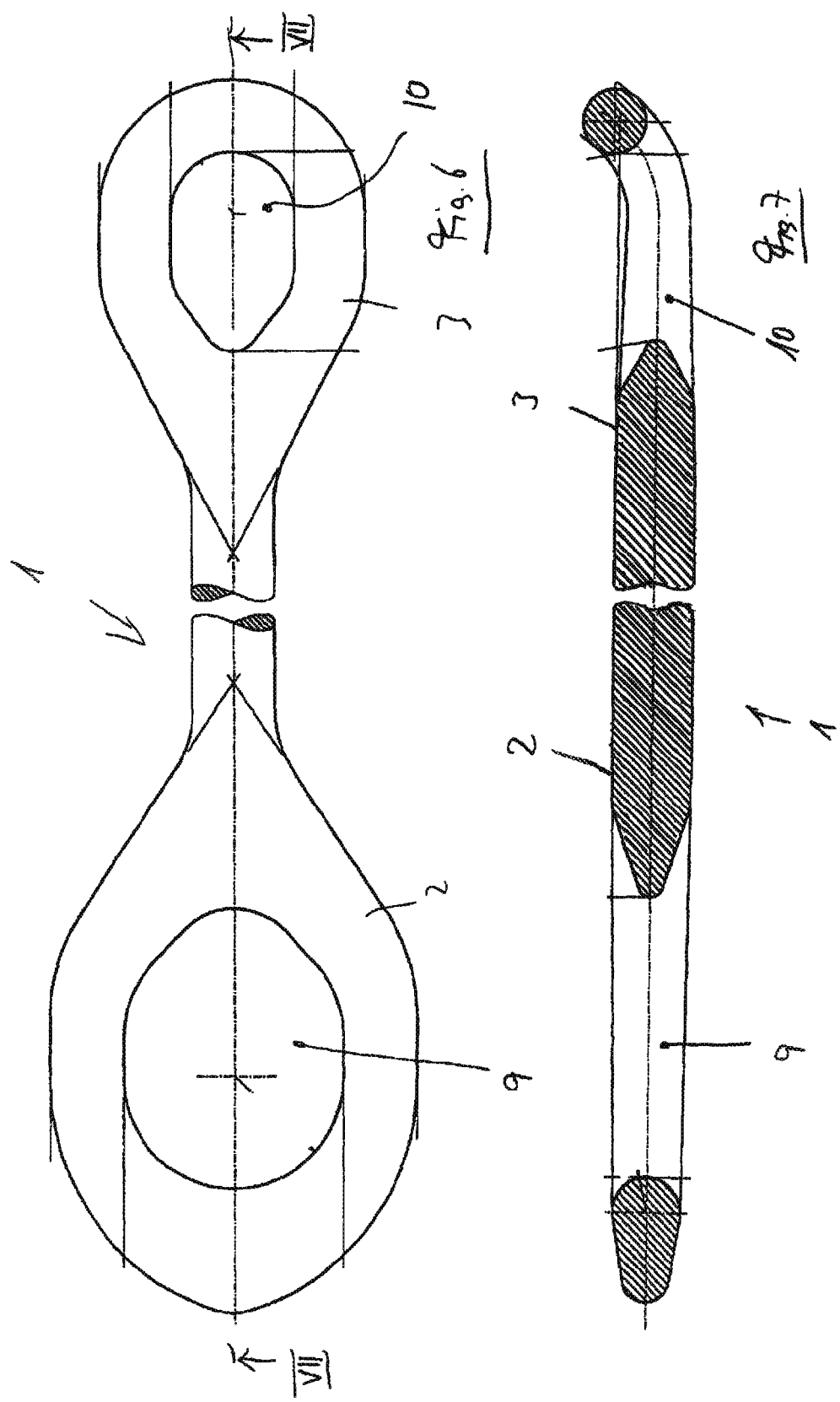

US 8,978,961 B2

METHOD FOR PRODUCING CONNECTING ELEMENTS BY WAY OF A PRESSURE WELDING PROCESS AND CONNECTING ELEMENT

TITLE OF THE INVENTION

The present application is a 371 of International application PCT/DE2009/001003 filed Jul. 18, 2009, which claims priority of DE 10 2008 050 581.1, filed Sep. 26, 2008, the priority of these applications is hereby claimed and these applications are incorporated herein by reference.

BACKGROUND OF THE INVENTION

The invention concerns a method for producing connecting elements for the coupling of functional elements in applications in the field of oil drilling technology, where the connecting elements each have two end pieces and at least one spacer that connects the end pieces with each other.

The invention also concerns a connecting element for the coupling of functional elements in applications in the field of oil drilling technology, where the connecting element has two end pieces and at least one spacer that connects the end pieces with each other.

Connecting elements of this type are used especially in the field of petroleum engineering for coupling mounting devices for casing pipes or conveying pipes with a positioning device. The positioning device conveys the pipe sections supported by the mounting devices to an assembly positioning. Connecting elements for applications of this type are usually called elevator links. In another application, connecting elements of this type can also be used for coupling traveling blocks with swivels. In these kinds of applications, the connecting elements are called swivel bails. In a third application, a connection is made between a traveling block and a top drive, which provides a drill drive. For these applications, the connecting elements are usually referred to as tie rods.

The connecting elements are typically made of steel, have a length of several meters, and are very heavy, often weighing several tons. To ensure high mechanical load capacity of the connecting elements, they are made of forged steel. Due to the great size and weight of the connecting elements, only a few forges have the capacity to produce them. This results in long delivery times and lead times.

SUMMARY OF THE INVENTION

The objective of the invention is to develop a method of the aforementioned type that makes it possible to simplify the production of the connecting elements.

In accordance with the invention, this objective is achieved in such a way that at least one spacer is joined with at least one of the end pieces by pressure welding.

A further objective of the present invention is to design a connecting element of the aforementioned type in such a way that the production process is simplified.

In accordance with the invention, this objective is achieved in such a way that at least one spacer is joined with at least one of the end pieces by pressure welding.

The method of the invention makes it possible for the connecting elements to be produced from individual parts and, after the individual parts of a connecting element have been joined, for the connecting element to achieve a load capacity that is at least as great as that of a connecting element produced as a single part. In particular, it is possible to provide the individual parts with dimensions that are conducive to simple, single-part production. In particular, this makes it possible to use small forging installations to produce the individual parts and thus to increase significantly the number of forges that potentially can be used for the production process.

A welded joint with a high load capacity is achieved by using friction welding.

In accordance with another process variant, it is also possible to use flash butt welding.

The realization of a robust construction is supported by welding together parts that are made of steel.

The load capacity can be further increased by welding together parts that are made of forged steel.

Especially high strength is achieved by multiple forging of the individual parts, for example, six times.

High flexibility with predetermined dimensioning can be achieved by positioning two spacers in succession in the direction of the longitudinal axis of the connecting element.

High production flexibility can be achieved especially if at least one spacer is taken from a modular system of spacers of different lengths.

Specific embodiments of the invention are illustrated in the drawings.

BRIEF DESCRIPTION OF THE DRAWING

FIG. 1 is a side view of a connecting element produced from two individual pieces and a spacer.

FIG. 2 is an enlarged view of detail II in FIG. 1.

FIG. 3 shows an embodiment that is a modification of the embodiment of FIG. 1 with two spacers arranged in succession.

FIG. 4 shows an embodiment that is shorted compared to the design shown in FIG. 3.

FIG. 5 shows an embodiment that is further shortened.

FIG. 6 is an enlarged partial top view in viewing direction VI in FIG. 1.

FIG. 7 is a longitudinal section along sectional line VII-VII in FIG. 6.

DETAILED DESCRIPTION OF THE INVENTION

According to the embodiment in FIG. 1, the connecting element 1 consists of end pieces 2, 3 and a spacer 4. The end pieces 2, 3 and the spacer 4 are arranged in succession in the direction of the longitudinal axis 5. Welds 6 that join the spacer 4 with each of the end pieces 2, 3 are located in the end regions of the end pieces 2, 3 that face the spacer 4. The spacers 4 can be realized, for example, as bar-shaped structural elements. However, it is also possible to form the spacers as plates or sectional elements.

The welds 6 are typically produced by pressure welding. Depending on the specific requirements on the production processes to be carried out and the requirements on the welded connecting elements 1, various welding methods can be used. For example, it is possible to use friction welding, which can be carried out both as rotational friction welding and orbital welding. In rotational friction welding, the parts to be welded together rotate relative to each other while pressure is being applied, while in orbital welding, only small-dimensioned rotary movements of at least one of the parts relative to the other part are carried out to generate the required frictional heat.

Other processes that can be used are flash butt welding, capacitor discharge welding and induction welding.

In general, in all of the aforementioned processes, an effort is made not to melt the material to be welded but rather to bring the material only to a temperature of about 100-150° C. below the melting point in the vicinity of the surfaces to be joined. This is a temperature range in which forging of the material is also typically carried out. Joining the parts at this temperature under suitably high pressure avoids adverse effects on the internal structure of the material, which could lead to loss of strength and/or excessively high hardness of the material.

As has already been mentioned, the welds 6 can be formed as friction welds. In friction welding of the connecting elements 1, the feedstock that is used is friction welded or the spacer 4 is welded between the prefabricated end pieces 2, 3. The welding process provides a joint that is characterized by integral material bonding. During the welding operation, a feedstock part or a prefabricated end piece 2, 3 is rigidly clamped down. The opposing part is aligned and set in rotational motion according to one process variant. One of the parts to be welded is moved against the opposing piece with pressure. The resulting friction provides the heat necessary for the friction welding. When the intended welding temperature has been reached, the parts to be welded are pressed against each other with a well-defined pressure. The generated heat and the mechanical movement cause a very high-quality weld to be produced during cooling. The strength of the weld is greater than that of the base material.

In accordance with another process variant that was mentioned earlier, the spacer 4 is joined with the end pieces 2, 3 by flash butt welding. In this process, the parts to be joined with each other are aligned relative to each other, and then an electric current is generated through the parts. The parts are brought against each other so tightly that the uppermost layer of material is flashed off in a vaporized or molten state by the short-term high current densities that are generated. If necessary, this operation is repeated multiple times. The flow of current causes the ends of the two parts to be heated so strongly that the facing areas of material of the parts to be joined with each other reach a temperature in the range of the forging temperature. In this process of bringing the material to the desired temperature, the two parts to be joined are again pressed together with a well-defined pressure. This method allows simple positioning of the parts.

FIG. 2 shows an enlarged view of detail II in FIG. 1. In particular, the drawing reveals that a connecting element 7 of the end piece 2 is arranged facing the spacer 4 and has a somewhat larger diameter transverse to the longitudinal axis 5 than the spacer 7. A dimension transition is preferably realized in the region of the weld 6 with an angle 8 that is measured relative to the longitudinal axis 5.

FIG. 3 shows an embodiment with two spacers 4 arranged in succession in the direction of the longitudinal axis 5. FIG. 4 shows an embodiment that is a modification of the embodiment of FIG. 3 with shorter spacers 4, and FIG. 5 shows an embodiment in which only one spacer 4 is used.

In particular, it is proposed, in all embodiments with different lengths, that the same end pieces 2, 3 be used and that only the number of spacers 4 and/or their length be varied to adapt to the requirements of the given application. Relative to each other, the end pieces 2, 3 typically have different designs.

In principle, it is also possible to use a modular assortment of different end pieces 2, 3 and different spacers 4 and, depending on the specific application, to join the particular parts that are needed or to provide special sizes. This simplifies storage and production and results in short production times and short disposition times.

Steel is typically used as the material for the connecting element 1. The use of a CrNi steel is preferred.

The material for the connecting element 1 is preferably a forged steel. In particular, it is proposed that multiple forging reduction be realized.

FIG. 6 shows a top view of the connecting element 1. It is apparent from this view that the end pieces 2, 3 are formed as lugs and enclose ring-shaped recesses 9, 10. The lugs are produced by a forging operation.

FIG. 7 illustrates that in the region of their boundaries facing the recesses 9, 10, the end pieces 2, 3 have a rounded contour or a rounded tapering contour. This makes it easier to hang assigned parts in the recesses 9, 10.

In accordance with a preferred embodiment, it is proposed that at least one of the parts to be joined, but preferably both parts, be provided with a depression in a central area of the surfaces to be joined with each other. The depression can be realized, for example, as a bored or milled depression. The removal of material in the central area of the surface avoids dissemination of material from this area into the weld 6. Due to the process involved in the production of the individual parts, these areas often contain accumulations of substances that would impair the quality of the weld 6.

In accordance with another preferred embodiment, at least one of the surfaces of the individual parts to be joined, which face each other during the welding operation, is formed so that it is not exactly flat but rather has at least one elevation. In this way, a well-defined starting point for the softening of the material is defined, since the frictional heat develops in these areas first and then spreads from there to the remaining surface area.

In accordance with another preferred embodiment, it is proposed that a cooling operation be undertaken under open-loop or closed-loop control after completion of the welding operation. After completion of the welding operation, only relatively small areas of material in the immediate vicinity of the weld 6 have been brought to high temperature, while areas of material farther from the weld remain relatively cold due to the speed with which the welding operation is carried out. Therefore, the heat dissipates relatively quickly into the cooler areas, so that the previously heated areas of the material undergo rapid cooling. This rapid cooling of the material leads to a locally hard material consistency, which is undesirable in many applications. This kind of undesired rapid cooling of the material can be avoided by undertaking a heating operation in a systematic way. For example, it is possible to place an induction coil in the vicinity of a weld and to generate a current in the corresponding region of the connecting element 1 for a predetermined length of time. This allows cooling to proceed at a predetermined slow rate.

Typically, a continuous cooling process is predetermined for a certain period of time. Alternatively, it is also possible to supply heat, for example, by gas burners, radiant energy, or induction.

In accordance with another embodiment, it is proposed that after the cooling process has been completed, the weld be annealed to reduce the hardness of the material.

The invention claimed is:

1. A method for producing connecting elements for coupling functional elements in applications in the field of oil drilling technology, wherein the connecting elements each have two end pieces made of forged steel, and at least one spacer made of forged steel that connects the end pieces with each other, the method comprising: forming the end pieces by forging to form lugs, wherein each lug consists of a first portion having a solid cross-section, a second portion enclosing a ring-shaped recess and a third portion having a solid cross-section such that the second portion is formed between said first portion and third portion; and joining at least one spacer with at least one of the end pieces by pressure welding.

2. The method in accordance with claim 1, including joining by friction welding.

3. The method in accordance with claim 1, including joining by flash butt welding.

4. The method in accordance with claim 1, wherein the individual parts are multiply forged.

5. The method in accordance with claim 1, including positioning two spacers in succession in a direction of a longitudinal axis of the connecting element.

6. The method in accordance with claim 1, including selecting at least one spacer from a modular system of spacers of different lengths.

7. The method in accordance with claim 1, including, prior to welding, providing at least one of the parts to be joined together with a recess in a central area of a surface to be welded.

8. The method in accordance with claim 1, including, after welding has been carried out, cooling material of the connecting element in a vicinity of the weld at a controlled rate by supplying heat.

9. A connecting element for coupling functional elements in applications in the field of oil drilling technology, the connecting element comprising: two end pieces made of forged steel and forming lugs, wherein each lug consists of a first portion having a solid cross-section, a second portion enclosing a ring-shaped recess and a third portion having a solid cross-section such that the second portion is formed between said first portion and third portion; and at least one spacer made of forged steel that connects the end pieces with each other, wherein the at least one spacer is joined with at least one of the end pieces by pressure welding.

10. The connecting element in accordance with claim 9, wherein the spacer is joined with the end piece by a friction weld.

11. The connecting element in accordance with claim 9, wherein the spacer is joined with the end piece by a flash butt weld.

12. The connecting element in accordance with claim 9, wherein the steel is multiply forged.

13. The connecting element in accordance with claim 9, wherein two spacers are positioned in succession in a direction of a longitudinal axis of the connecting element.

14. The connecting element in accordance with claim 9, wherein the spacer is an element of a modular system of spacers of different lengths.

15. The connecting element in accordance with claim 9, wherein a depression is formed in a central area of the weld in at least one of the parts to be joined with each other and at least some of the depression is filled by the weld.

* * * * *